(12) United States Patent
Alipoor et al.

(10) Patent No.: US 11,509,153 B2
(45) Date of Patent: Nov. 22, 2022

(54) CHARGE/DISCHARGE CONTROL METHOD FOR STORAGE SYSTEM AND CHARGE/DISCHARGE CONTROL DEVICE

(71) Applicant: SAVE THE PLANET CO., LTD., Osaka (JP)

(72) Inventors: Jaber Alipoor, Osaka (JP); Yukihiro Shimizu, Osaka (JP); Hirofumi Konishi, Osaka (JP); Masaki Nakaishi, Osaka (JP); Hisashi Nakabayashi, Osaka (JP)

(73) Assignee: SAVE THE PLANET CO., LTD., Osaka (JP)

( * ) Notice: Subject to any disclaimer, the term of this patent is extended or adjusted under 35 U.S.C. 154(b) by 164 days.

(21) Appl. No.: 16/932,740

(22) Filed: Jul. 18, 2020

(65) Prior Publication Data

US 2021/0021141 A1    Jan. 21, 2021

(30) Foreign Application Priority Data

Jul. 18, 2019  (JP) .............................. JP2019-132861
Dec. 9, 2019   (JP) .............................. JP2019-222150

(51) Int. Cl.
 *H02J 7/00*   (2006.01)
 *H02J 7/35*   (2006.01)

(52) U.S. Cl.
 CPC ............ *H02J 7/0048* (2020.01); *H02J 7/005* (2020.01); *H02J 7/007* (2013.01); *H02J 7/0013* (2013.01); *H02J 7/0014* (2013.01); *H02J 7/00714* (2020.01); *H02J 7/007182* (2020.01); *H02J 7/0018* (2013.01); *H02J 7/35* (2013.01)

(58) Field of Classification Search
 CPC ...... H02J 7/0048; H02J 7/0013; H02J 7/0014; H02J 7/007
 USPC ......................................................... 320/103
 See application file for complete search history.

(56) References Cited

U.S. PATENT DOCUMENTS

| | | | | |
|---|---|---|---|---|
| 5,658,682 A | * | 8/1997 | Usuda ................... | H01M 10/48 429/93 |
| 5,726,551 A | * | 3/1998 | Miyazaki ................ | B60L 53/12 320/155 |
| 5,773,959 A | * | 6/1998 | Merritt .................. | H02J 7/0016 320/120 |
| 5,872,444 A | * | 2/1999 | Nagano ................. | H02J 7/0071 320/110 |
| 5,905,362 A | * | 5/1999 | Nagano ................. | H02J 7/0071 320/125 |
| 6,008,620 A | * | 12/1999 | Nagano ............... | H02J 7/00047 320/132 |

(Continued)

FOREIGN PATENT DOCUMENTS

JP    2012-161190 A    8/2012
JP    2017-112734 A    6/2017

*Primary Examiner* — John T Trischler
(74) *Attorney, Agent, or Firm* — Maschoff Brennan (57) ABSTRACT

In a storage system including a plurality of battery units, the charge/discharge amounts of the battery units are determined by predetermined computation using the state of charge (SOC). The predetermined computation includes allocating a larger discharge amount to a battery unit higher in SOC, out of the battery units, in the discharge mode, and allocating a larger charge amount to a battery unit lower in SOC, out of the battery units, in the charge mode.

5 Claims, 7 Drawing Sheets

(56) References Cited

U.S. PATENT DOCUMENTS

| | | | | |
|---|---|---|---|---|
| 6,225,783 B1* | 5/2001 | Nagano | H02J 7/00036 | 320/128 |
| 6,290,012 B1* | 9/2001 | Matsubara | B60K 6/485 | 903/917 |
| 6,441,587 B2* | 8/2002 | Okada | H02J 7/0047 | 320/136 |
| 6,573,687 B2* | 6/2003 | Kimura | H02J 7/0013 | 320/132 |
| 7,388,352 B2* | 6/2008 | Bayne | H02J 7/0019 | 320/112 |
| 7,489,106 B1* | 2/2009 | Tikhonov | B60L 58/15 | 320/120 |
| 7,933,694 B2* | 4/2011 | Kato | B60K 6/365 | 320/135 |
| 8,292,009 B2* | 10/2012 | Yamada | B60W 10/08 | 180/65.21 |
| 8,674,658 B2* | 3/2014 | Wang | H02J 7/0014 | 320/121 |
| 9,136,713 B1* | 9/2015 | Cheng | H02J 7/0019 | |
| 9,438,059 B2* | 9/2016 | Komoda | H02J 7/007184 | |
| 9,566,875 B2* | 2/2017 | Kawakita | H02J 7/00716 | |
| 9,768,642 B2* | 9/2017 | Shimizu | H02J 3/381 | |
| 9,914,449 B2* | 3/2018 | Yamazaki | B60W 20/13 | |
| 10,101,401 B2* | 10/2018 | Sejima | G01R 31/3842 | |
| 10,141,750 B2* | 11/2018 | Hsieh | H02J 7/00041 | |
| 10,353,007 B2* | 7/2019 | Wada | G01R 31/367 | |
| 10,424,931 B2* | 9/2019 | Hanada | H02J 7/04 | |
| 10,763,682 B2* | 9/2020 | Kim | H02J 7/0013 | |
| 11,372,051 B2* | 6/2022 | Arima | G01R 31/3648 | |
| 2001/0033150 A1* | 10/2001 | Kimura | H01M 10/441 | 320/132 |
| 2001/0054879 A1* | 12/2001 | Okada | G01R 31/3828 | 320/132 |
| 2005/0083017 A1* | 4/2005 | Suzuki | H02J 7/0047 | 320/128 |
| 2006/0152196 A1* | 7/2006 | Matsumoto | H02J 7/0072 | 320/132 |
| 2007/0001644 A1* | 1/2007 | Bayne | H02J 7/0027 | 320/107 |
| 2009/0066296 A1* | 3/2009 | Wang | H01M 10/441 | 320/160 |
| 2010/0100264 A1* | 4/2010 | Kato | B60K 6/365 | 180/65.25 |
| 2010/0207587 A1* | 8/2010 | Oyobe | H01M 10/6563 | 320/152 |
| 2010/0224428 A1* | 9/2010 | Yamada | B60K 6/365 | 180/65.21 |
| 2011/0043393 A1* | 2/2011 | Tamura | H02J 7/0048 | 341/118 |
| 2011/0241622 A1* | 10/2011 | Li | H01M 10/42 | 320/116 |
| 2011/0260687 A1* | 10/2011 | Kudo | H01M 10/441 | 320/118 |
| 2012/0038320 A1* | 2/2012 | Kabasawa | H02J 7/0019 | 320/112 |
| 2012/0161692 A1* | 6/2012 | Kobayashi | B60L 58/13 | 320/109 |
| 2013/0013238 A1* | 1/2013 | Kawakita | B60L 58/12 | 702/63 |
| 2013/0099723 A1* | 4/2013 | Li | H01M 10/482 | 320/103 |
| 2013/0147434 A1* | 6/2013 | Boehm | H01M 10/482 | 320/118 |
| 2013/0229154 A1* | 9/2013 | Benjamin | H01M 10/48 | 320/132 |
| 2013/0271068 A1* | 10/2013 | Komoda | H02J 7/0016 | 320/134 |
| 2013/0300425 A1* | 11/2013 | Shiraishi | H02J 7/35 | 324/426 |
| 2014/0339891 A1* | 11/2014 | Ohkawa | B60L 3/0046 | 320/134 |
| 2015/0019149 A1* | 1/2015 | Li | H01M 16/00 | 702/63 |
| 2015/0042289 A1* | 2/2015 | Yoshida | H01M 10/441 | 320/136 |
| 2015/0219724 A1* | 8/2015 | Gibbs | G01R 19/16542 | 324/426 |
| 2015/0236525 A1* | 8/2015 | Aridome | B60L 58/22 | 320/107 |
| 2015/0303719 A1* | 10/2015 | Takahashi | H02J 7/0021 | 320/134 |
| 2016/0006278 A1* | 1/2016 | Sakakibara | H02J 7/0013 | 320/112 |
| 2016/0064970 A1* | 3/2016 | Shimizu | H02J 3/381 | 320/134 |
| 2016/0181837 A1* | 6/2016 | Shu | H02J 7/0016 | 320/119 |
| 2016/0190830 A1* | 6/2016 | Kuhlmann | H02J 7/0016 | 320/116 |
| 2016/0259012 A1* | 9/2016 | Sejima | G01R 31/3842 | |
| 2016/0268827 A1* | 9/2016 | Ziegenfuss | H01R 13/64 | |
| 2016/0380315 A1* | 12/2016 | Weicker | H02J 7/1423 | 320/136 |
| 2017/0077719 A1* | 3/2017 | Onat | H02J 7/00712 | |
| 2017/0117721 A1* | 4/2017 | Toya | H02J 7/0016 | |
| 2017/0120772 A1* | 5/2017 | Alser | H02J 7/0048 | |
| 2017/0129361 A1* | 5/2017 | Scaringe | H02J 7/0048 | |
| 2017/0256945 A1* | 9/2017 | Hanada | H02J 7/007 | |
| 2017/0324268 A1* | 11/2017 | Hanada | H02J 3/381 | |
| 2017/0371000 A1* | 12/2017 | Fukushima | H02J 7/005 | |
| 2018/0183239 A1* | 6/2018 | Shibata | H02J 7/007182 | |
| 2018/0212441 A1* | 7/2018 | Hsieh | H02J 7/0048 | |
| 2019/0058340 A1* | 2/2019 | Park | H02J 7/0077 | |
| 2020/0220364 A1* | 7/2020 | Wang | H02J 7/00712 | |
| 2020/0395771 A1* | 12/2020 | Hiratsuka | H02J 7/0025 | |
| 2021/0021134 A1* | 1/2021 | Alipoor | H02J 7/0014 | |
| 2021/0194270 A1* | 6/2021 | Souma | H02J 7/35 | |
| 2021/0305837 A1* | 9/2021 | Hung | H01M 10/441 | |
| 2022/0021221 A1* | 1/2022 | Tyagi | H02J 7/0014 | |
| 2022/0037900 A1* | 2/2022 | Hi | H02J 9/06 | |
| 2022/0229117 A1* | 7/2022 | Yabu | H02J 3/32 | |

* cited by examiner

CHARGE/DISCHARGE CONTROL METHOD FOR STORAGE SYSTEM AND CHARGE/DISCHARGE CONTROL DEVICE

CROSS-REFERENCE TO RELATED APPLICATIONS

This application claims priority to Japanese Patent Application Nos. 2019-132861 and 2019-222150 filed on Jul. 18, 2019 and Dec. 9, 2019, the entire disclosures of which are incorporated by reference herein.

BACKGROUND

The present disclosure relates to a technology for controlling charge/discharge in a storage system including a plurality of battery units.

With the widespread adoption of solar power generation, a solar power generation system having a storage battery is increasingly gaining widespread use as a means for stabilization and supply-demand balancing of the power supply system and also in preparation for a possible long-term power outage due to a disaster. Also, with reduction in the cost of storage batteries, there is increasing demand for installing additional storage batteries to an existing system for use as a solar power generation system having a plurality of storage batteries.

Japanese Unexamined Patent Publication No. 2017-112734 discloses a technology in which, in a battery module for vehicles including a plurality of serially connected battery cells, a battery control system, which controls the state of charge (SOC) indicating the remaining charged amount of each battery cell, prevents the SOC of the battery cell from falling below its lower limit.

SUMMARY

For a storage system including a plurality of battery units, when the SOC of one battery unit reaches its lower limit, for example, this battery unit is unable to discharge any more power, resulting in that the power capacity of the entire storage system will decrease. Therefore, in order to perform suitable charge/discharge control over a plurality of battery units, it is preferable to keep the charged states of the battery units so that the SOC of a specific battery unit should not reach its lower or higher limit ahead of that of any other battery unit.

An objective of the present disclosure is realizing suitable charge/discharge control in a storage system including a plurality of battery units.

In the first mode of the present disclosure, a method for controlling charge/discharge of first and second battery units in a storage system including the first and second battery units is provided. The method includes: acquiring values of a state of charge (SOC; a ratio of a remaining electric quantity to an electric capacity value) of the first and second battery units; and determining charge/discharge amounts of the first and second battery units according to predetermined computation using the acquired SOC values, wherein the predetermined computation includes allocating a larger discharge amount to a battery unit higher in SOC, out of the first and second battery units, in the discharge mode, and allocating a larger charge amount to a battery unit lower in SOC, out of the first and second battery units, in the charge mode.

According to the above configuration, in the storage system, the charge/discharge amounts of the first and second battery units are determined by predetermined computation using the SOCs. This predetermined computation includes allocating a larger discharge amount to a battery unit higher in SOC, out of the first and second battery units, in the discharge mode and allocating a larger charge amount to a battery unit lower in SOC, out of the first and second battery units, in the charge mode. This makes it possible to keep the SOCs of the first and second battery units at values as close to each other as possible, avoiding an occurrence that the SOC of one battery unit may reach a lower or higher limit ahead of that of the other battery unit. Therefore, more suitable charge/discharge control can be realized. For example, even when a battery unit different in SOC from an existing battery unit is additionally installed in the storage system, suitable charge/discharge control can be realized.

In this mode, the predetermined computation may include allocating the discharge amounts to the first and second battery units so that the SOCs of the first and second battery units can be gradually closer to each other while falling in the discharge mode, and allocating the charge amounts to the first and second battery units so that the SOCs of the first and second battery units can be gradually closer to each other while rising in the charge mode.

According to the above, the SOCs of the first and second battery units are gradually closer to each other while falling in the discharge mode, and the SOCs of the first and second battery units are gradually closer to each other while rising in the charge mode. This makes it possible to keep the SOCs of the first and second battery units at values as close to each other as possible, avoiding an occurrence that the SOC of one battery unit may reach a lower or higher limit ahead of that of the other battery unit. Therefore, more suitable charge/discharge control can be realized.

Further in this mode, the predetermined computation may include allocating the discharge amounts to the first and second battery units so that the SOCs of the first and second battery units can reach a discharge target value at the same timing in the discharge mode, and allocating the charge amounts to the first and second battery units so that the SOCs of the first and second battery units can reach a charge target value at the same timing in the charge mode.

According to the above, in the predetermined computation, the discharge amounts are allocated so that the SOCs of the first and second battery units can reach a discharge target value at the same timing in the discharge mode, and the charge amounts are allocated so that the SOCs of the first and second battery units can reach a charge target value at the same timing in the charge mode. Therefore, since an occurrence that the SOC of one battery unit may reach a lower or higher limit ahead of that of the other battery unit can be surely avoided, it is possible to make full use of the energy of the storage system.

Further in this mode, the acquired SOC values of the first and second battery units may be converted to new SOC values using the electric capacity values of the first and second battery units, and the predetermined computation may be executed using the new SOC values in place of the acquired SOC values.

According to the above, even when the electric capacity values of the first and second battery units are different from each other, charge/discharge control can be performed accurately. For example, even when a battery unit different in electric capacity value from an existing battery unit is additionally installed in the storage system, suitable charge/discharge control can be realized.

Further, in the discharge mode, the new SOC values may be determined by multiplying the acquired SOC values of the first and second battery units by conversion factors obtained using the electric capacity values of the first and second battery units, and the conversion factor by which the SOC of the first or second battery unit whichever is larger in electric capacity value is multiplied may be larger than the conversion factor by which the SOC of the other battery unit is multiplied.

According to the above, even when the electric capacity values of the first and second battery units are different from each other, charge/discharge control can be performed accurately.

In the second mode of the present disclosure, a method for controlling charge/discharge of a plurality of battery units in a storage system including the plurality of battery units is provided. The method includes the steps of: (a) dividing the plurality of battery units into two groups; (b) calculating, using a state of charge (SOC; a ratio of a remaining electric quantity to an electric capacity value) of a battery unit belonging to each of the two groups, an equivalent SOC; (c) determining charge/discharge amounts of the two groups according to predetermined computation using the calculated equivalent SOCs; (d) further dividing a plurality of battery units included in each of the groups into two groups and executing steps (b) and (c); and (e) repeating step (d) until each group includes only one battery unit, wherein the predetermined computation includes allocating a larger discharge amount to a group higher in equivalent SOC, out of the two groups, in the discharge mode, and allocating a larger charge amount to a group lower in equivalent SOC, out of the two groups, in the charge mode.

According to the above, in a storage system including three or more battery units, since charge/discharge amounts can be allocated to these battery units as in the first mode, more suitable charge/discharge control can be realized.

In the third mode of the present disclosure, a control device for controlling charge/discharge of first and second battery units in a storage system including the first and second battery units is provided. The control device includes an arithmetic unit configured to determine charge/discharge amounts of the first and second battery units using values of a state of charge (SOC; a ratio of a remaining electric quantity to an electric capacity value) of the first and second battery units, wherein the arithmetic unit allocates a larger discharge amount to a battery unit higher in SOC, out of the first and second battery units, in the discharge mode, and allocates a larger charge amount to a battery unit lower in SOC, out of the first and second battery units, in the charge mode.

According to the above, in the storage system, the charge/discharge amounts of the first and second battery units are determined by the arithmetic unit using the SOC values. The arithmetic unit allocates a larger discharge amount to a battery unit higher in SOC, out of the first and second battery units, in the discharge mode, and allocates a larger charge amount to a battery unit lower in SOC, out of the first and second battery units, in the charge mode. This makes it possible to keep the SOCs of the first and second battery units at values as close to each other as possible, avoiding an occurrence that the SOC of one battery unit may reach a lower or higher limit ahead of that of the other battery unit. Therefore, more suitable charge/discharge control can be realized.

According to the present disclosure, suitable charge/discharge control can be realized in a storage system including a plurality of battery units.

DETAILED DESCRIPTION

Embodiments of the present disclosure will be described hereinafter in detail with reference to the accompanying drawings. Note that the following description of the preferred embodiments is essentially mere illustration and is not intended to limit the present disclosure, the applicable scope thereof, or the use thereof.

Embodiment 1

<Configuration of Storage System>

Figure 1:
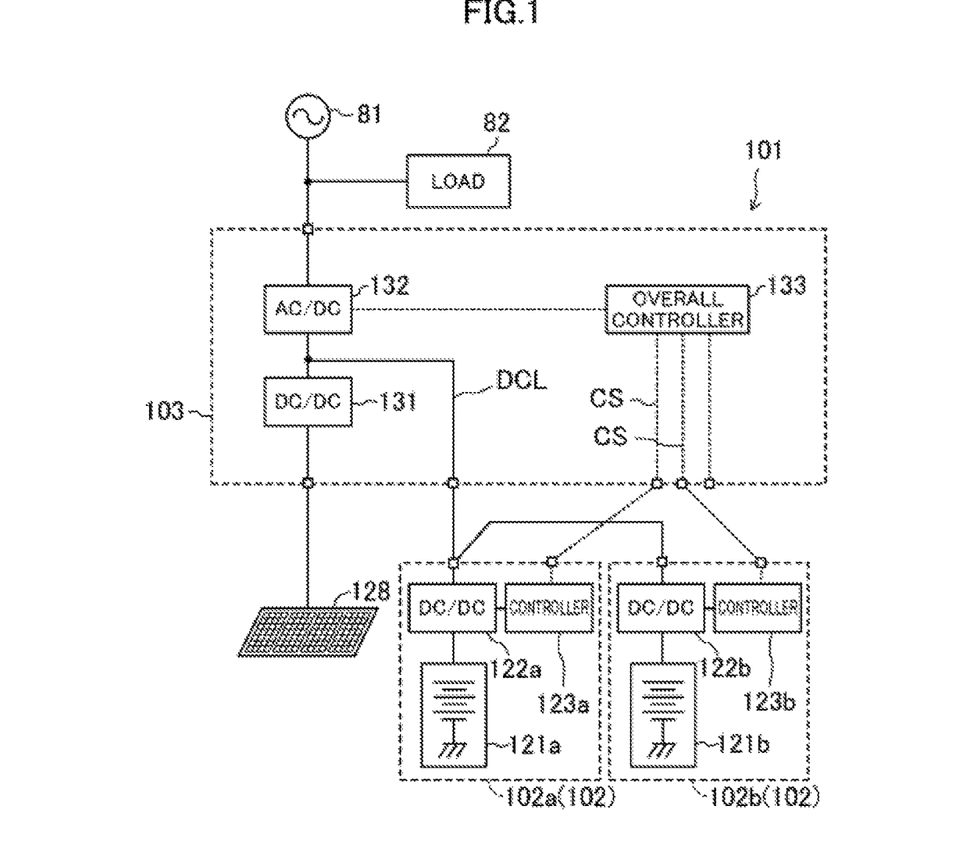
FIG. 1 is a block diagram showing the entire configuration of a storage system of Embodiment 1.

FIG. 1 is a view showing a configuration of a storage system and its periphery according to this embodiment.

The storage system 101 includes a power conditioner 103 and a plurality of storage battery units 102 connected to the power conditioner 103. FIG. 1 shows an example in which two storage battery units 102 different in the state of health (SOH) are connected in series to the power conditioner 103. Note that the wording "connected" as used in this embodiment is not limited to direct connection but refers to electric connection as a whole. For example, it includes a case where units are electrically connected mutually via a passive element such as a resistance and a relay.

The storage battery units 102 each include a storage battery 121, a bidirectional DC/DC converter 122 connected to the storage battery 121, and a storage controller 123 that controls the operation of the DC/DC converter 122. Output power from the storage battery 121 is output outside via the DC/DC converter 122, and input power from outside is received via the DC/DC converter 122 to charge the storage battery 121. Note herein that, when two storage battery units 102 are described distinctively from each other, the storage battery unit 102, the storage battery 121, the DC/DC converter 122, and the storage controller 123 may be differently denoted by 102a, 121a, 122a, and 123a, respectively, for one of the storage battery units, and by 102b, 121b, 122b, and 123b, respectively, for the other storage battery unit, for convenience of description.

The storage controller 123, which can be implemented by a microcomputer, for example, has a function of controlling the storage battery unit 102 comprehensively based on a program, etc. stored in a memory (not shown). The storage controller 123 is connected to an overall controller 133 of the power conditioner 103 to be described later, and receives a charge/discharge control signal CS from the overall controller 133. The storage controller 123 controls the operation of the DC/DC converter 122 based on the program, the charge/discharge control signal CS, etc. thereby controlling the charge/discharge of the storage battery 121.

The power conditioner 103, which is a bidirectional power converter, includes a DC/DC converter 131, an inverter 132, and the overall controller 133. The power conditioner 103 is configured to supply power received from the storage battery unit 102 to a load 82 and also cause reverse power flow to a commercial power supply system 81. The power conditioner 103 is also configured to convert power received from the commercial power supply system 81 and supply the converted power to the storage battery unit 102. The power conditioner 103 may also be connected with a solar power generation means 128 and have a function of supplying power from the solar power generation means 128 to the load 82 and to the storage battery unit 102 to charge the same.

The DC/DC converter 131 performs DC/DC conversion of DC input and outputs the result. FIG. 1 shows an example in which the DC/DC converter 131 is connected to the solar power generation means 128. The output of the DC/DC converter 131 is connected to the inverter 132 via a DC link line DCL. The inverter 132 converts the DC supplied via the DC link line DCL under the control of the overall controller 133, e.g., pulse width modulation (PWM) control. The inverter 132 also converts AC received from the power supply system side to DC and outputs the DC to the DC link line DCL. In the example of FIG. 1, since the DC/DC converter 122 is incorporated in the storage battery unit 102, the output of the storage battery unit 102 is directly connected to the DC link line DCL. Note that, since the concrete circuit configurations of the DC/DC converter 131 and the inverter 132 are available from prior art technologies, detailed description thereof is omitted here.

The overall controller 133 (corresponding to the charge/discharge controller) can be implemented by a microcomputer, for example, and has a function of controlling the entire operation of the storage system 101 based on a program, etc. stored in a memory (not shown). For example, by controlling the DC/DC converter 131 and the storage controller 123 of the storage battery unit 102, the overall controller 133 has functions of controlling the electric energy output from the solar power generation means 128 and the storage battery unit 102 to the DC link line DCL and controlling the electric energy with which the storage battery unit 102 is charged.

<Operation of Storage System>

The operation of the storage system 101 will be described hereinafter with reference to FIG. 2. In the following description, it is assumed that the storage battery unit 102a was installed first and the storage battery unit 102b was installed later and that, at the time of the later installation, the value of SOH (hereinafter also referred to simply as the SOH) of the storage battery 121a of the storage battery unit 102a is lower than the SOH of the storage battery 121b of the storage battery unit 102b.

A feature of the present disclosure is that the overall controller 133 receives SOH information for specifying the SOHs of the storage batteries 121a and 121b and controls the charge/discharge of the storage batteries 121a and 121b so that the difference in SOH between the storage batteries 121a and 121b should decrease.

The SOH information is not specifically limited as far as the information can specify the SOH, but may be, for example, the internal resistance, charge/discharge history, voltage value, current value, and state of charge (SOC) of the storage battery 121. The method for calculating the SOH based on the SOH information is not specifically limited, but a method using the retention of the capacity (the quantity of electric charge and the workload) and a method using the rate of increase in resistance (AC resistance or DC resistance), for example, can be employed. The method for measuring the SOC is not specifically limited, but an impedance track method, a battery cell modeling method, a Coulomb counter method, and a voltage measuring method, for example, can be employed.

Figure 2:
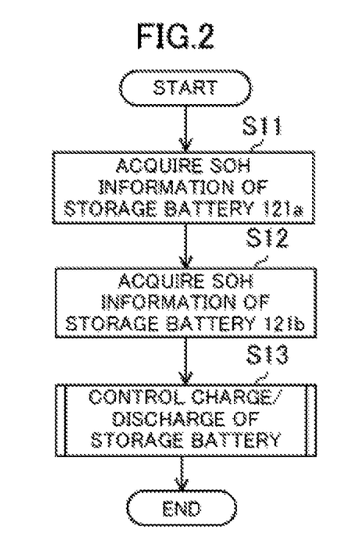
FIG. 2 is a flowchart showing an operation example of the storage system of Embodiment 1.

In step S11 in FIG. 2, the overall controller 133 acquires SOH information of the storage battery 121a and calculates the SOH based on the acquired information.

In step S12, the overall controller 133 acquires SOH information of the storage battery 121b and calculates the SOH based on the acquired information.

In the next step S13, the overall controller 133 outputs the charge/discharge control signals CS for the storage batteries 121a and 121b to the storage controllers 123a and 123b of the storage battery units 102a and 102b based on the SOH of the storage battery 121a and the SOH of the storage battery 121b calculated in steps S11 and S12 respectively so that the difference in SOH between the storage batteries 121a and 121b should decrease. The storage controllers 123a and 123b, having received the charge/discharge control signals CS, control the charge/discharge of the corresponding storage batteries 121a and 121b. Since the SOH of the storage battery 121a is lower than the SOH of the storage battery 121b in this example, the overall controller 133 controls the charge/discharge giving a higher priority to the storage battery 121b.

By repeatedly executing the processing of steps S11 to S13, the difference in SOH between the storage batteries 121a and 121b gradually decreases, and this decreasing state is maintained.

As described above, according to this embodiment, even when storage batteries different in SOH are connected to each other, the times of termination of the lives of these storage batteries can be made uniform. That is, taking the storage system 101 as a whole, the storage batteries 121 can be effectively used and the management of the lives of the batteries becomes easy.

The overall controller 133 may check the SOH of the storage battery 121a and the SOH of the storage battery 121b in real time or every given time period.

Also, the overall controller 133 may execute the control for reducing the difference in SOH between storage batteries once the difference in SOH between the storage batteries 121a and 121b reaches a predetermined threshold or more.

Although the case where the storage system 101 has two storage battery units 102 has been described in this embodiment, the number of storage battery units 102 is not specifically limited. For example, when the storage system 101 has three or more storage battery units 102, the overall controller 133 may acquire SOH information from the storage batteries 121 of the storage battery units 102 and control the charge/discharge of the storage battery units 102 based on the SOH information so that the difference in SOH among the storage batteries 121 should decrease, as in the case of FIG. 2.

Embodiment 2

Figure 3:
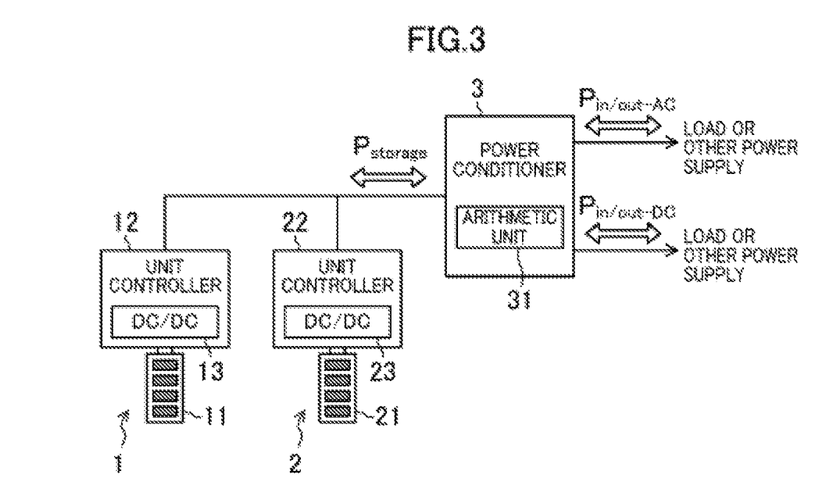
FIG. 3 shows a configuration example of storage systems of Embodiments 2 to 4.

FIG. 3 is a configuration example of a storage system. The storage system of FIG. 3 includes two chargeable/dischargeable battery units 1 and 2 and a power conditioner 3. The battery units 1 and 2 respectively include storage batteries 11 and 21 and unit controllers 12 and 22. The power conditioner 3 as an example of the charge/discharge control device controls the charge/discharge of the battery units 1 and 2. The unit controllers 12 and 22 respectively include bidirectional DC/DC converters 13 and 23, and execute the charge/discharge of the storage batteries 11 and 21 according to an instruction from the power conditioner 3. The power conditioner 3 includes an arithmetic unit 31 that computes the charge/discharge amounts of the battery units 1 and 2. The arithmetic unit 31 is implemented by a microcomputer provided with a processor and a memory, for example.

In Embodiment 2, the arithmetic unit 31 computes the charge/discharge amounts of the battery units 1 and 2 using the values of the state of charge (SOC) of the battery units 1 and 2. The SOC is herein assumed to be the ratio of the remaining electric quantity to the electric capacity value of the relevant battery unit. The power conditioner 3 allocates the charge/discharge amounts to the battery units 1 and 2 using the computation results.

In a storage system including a plurality of battery units, it is preferable to keep the SOCs of the battery units at values as close to each other as possible. In this embodiment, therefore, a larger discharge amount is allocated to a battery unit higher in SOC, out of the battery units 1 and 2, in the discharge mode, and a larger charge amount is allocated to a battery unit lower in SOC, out of the battery units 1 and 2, in the charge mode.

Computation Example in Discharge Mode

When the total discharge power of the storage system is $P_{Dschrg\text{-}Total}$, the SOCs of the battery units 1 and 2 are $SOC_1$ and $SOC_2$, and the discharge power values allocated to the battery units 1 and 2 are $P_{Dschrg1}$ and $P_{Dschrg2}$, the arithmetic unit 31 computes $P_{Dschrg1}$ and $P_{Dschrg2}$ according to Equations (1) and (2) below.

$$P_{Dschrg1} = \frac{3SOC_1 - SOC_2}{2(SOC_1 + SOC_2)} P_{Dschrg\text{-}Total} \quad (1)$$

$$P_{Dschrg2} = \frac{3SOC_2 - SOC_1}{2(SOC_1 + SOC_2)} P_{Dschrg\text{-}Total} \quad (2)$$

Equations (1) and (2) above are examples of computing equations for allocating a larger discharge amount to a battery unit higher in SOC, out of the battery units 1 and 2, in order to balance the SOCs of the battery units 1 and 2 with each other during discharging.

Computation Example in Charge Mode

When the total charge power of the storage system is $P_{Chrg\text{-}Total}$ and the charge power values allocated to the battery units 1 and 2 are $P_{Chrg1}$ and $P_{Chrg2}$, the arithmetic unit 31 computes $P_{Chrg1}$ and $P_{Chrg2}$ according to Equations (3) and (4) below.

$$P_{Chrg1} = \frac{2 - 3SOC_1 + SOC_2}{2(2 - (SOC_1 + SOC_2))} P_{Chrg\text{-}Total} \quad (3)$$

$$P_{Chrg2} = \frac{2 - 3SOC_2 + SOC_1}{2(2\,(SOC_1 | SOC_2))} P_{Chrg\text{-}Total} \quad (4)$$

Equations (3) and (4) above are examples of computing equations for allocating a larger charge power value to a battery unit lower in SOC, out of the battery units 1 and 2, in order to balance the SOCs of the battery units 1 and 2 with each other during charging.

As described above, according to this embodiment, in the storage system, the charge/discharge amounts of the battery units 1 and 2 are determined by predetermined computation using the SOCs. This computation includes allocating a larger discharge amount to a battery unit higher in SOC, out of the battery units 1 and 2, in the discharge mode, and allocating a larger charge amount to a battery unit lower in SOC, out of the battery units 1 and 2, in the charge mode. This makes it possible to keep the SOCs of the battery units 1 and 2 at values as close to each other as possible, avoiding an occurrence that the SOC of one battery unit may reach a lower or higher limit ahead of that of the other battery unit. Therefore, more suitable charge/discharge control can be realized. For example, even when a battery unit different in SOC from an existing battery unit is installed in the storage system, suitable charge/discharge control can be realized.

Derivation of Equations (1) to (4) will be described later. Note that the computation in this embodiment is not limited to Equations (1) to (4).

As a result of the computation, the charge/discharge amount of either one of the battery units may become a negative value. For example, if $P_{Dschrg1}$ becomes a negative value, this indicates that power excessing the total discharge power $P_{Dschrg\text{-}Total}$ is discharged from the battery unit 2 and the battery unit 1 is charged with extra power. When power transmission is not permitted between the battery units 1 and 2, however, it is not allowed to set the charge/discharge amounts of the battery units 1 and 2 at negative values. Measures are therefore required to address this. The reason why power transmission between battery units is not permitted is that the power transmission causes a loss of energy and thus is not rational. Measures are also required when a minimum charge amount and a minimum discharge amount are set for the battery units 1 and 2.

Figure 4:
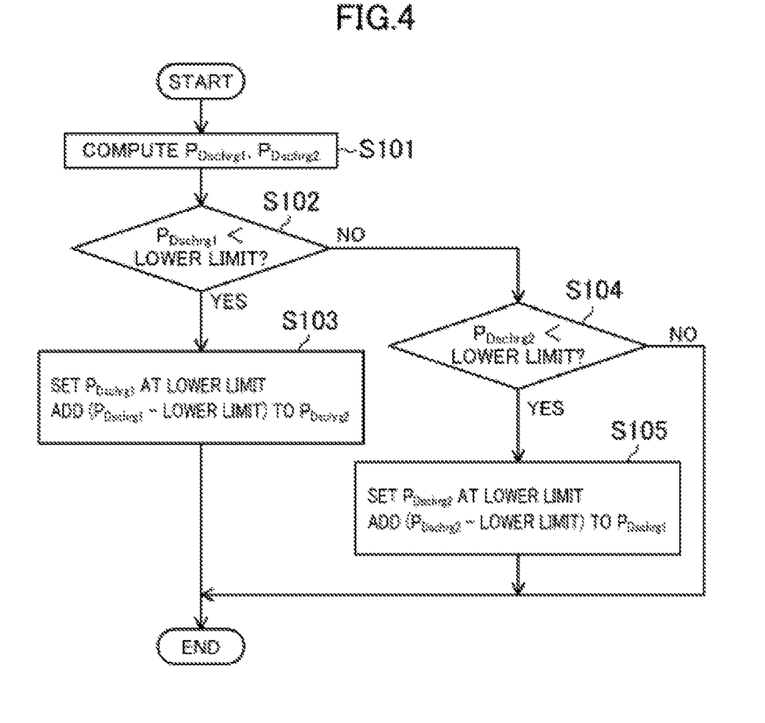
FIG. 4 shows an example of a power allocation algorithm according to Embodiment 2.

FIG. 4 shows an example of an algorithm according to this embodiment in the case where power transmission is not permitted between the battery units 1 and 2. The algorithm of FIG. 4 is related to power allocation in the discharge mode.

First, the discharge power values $P_{Dschrg1}$ and $P_{Dschrg2}$ to be allocated to the battery units 1 and 2 are computed according to Equations (1) and (2), for example (S101). Whether or not $P_{Dschrg1}$ is below a lower limit (assumed to be 0.0 in this case) is then determined (S102). If $P_{Dschrg1}$ is below the lower limit, $P_{Dschrg1}$ is set at the lower limit and ($P_{Dschrg1}$–lower limit) is added to $P_{Dschrg2}$ (S103). If $P_{Dschrg1}$ is not below the lower limit, whether or not $P_{Dschrg2}$ is below the lower limit is determined (S104). If $P_{Dschrg2}$ is below the lower limit, $P_{Dschrg2}$ is set at the lower limit and ($P_{Dschrg2}$–lower limit) is added to $P_{Dschrg1}$ (S105).

For example, assuming that $P_{Dschrg\text{-}Total}$ is 5.0 kw, $SOC_1$ is 80%, and $SOC_2$ is 20%, $P_{Dschrg1}$ and $P_{Dschrg2}$ are computed according to Equations (1) and (2) as follows.

$P_{Dschrg1}=((3\times0.8-0.2)/(2(0.8+0.2)))\times5.0=5.5$ kw $P_{Dschrg2}=((3\times0.2-0.8)/(2(0.2+0.8)))\times5.0=-0.5$ kw In this case, since $P_{Dschrg2}$ is below the lower limit, $P_{Dschrg2}$ is set at 0.0 and ($P_{Dschrg2}$–0.0) is added to $P_{Dschrg1}$. That is, $P_{Dschrg1}=5.5-0.5=5.0$ and $P_{Dschrg2}=0.0$ are obtained.

With the algorithm described above, it is possible to avoid an occurrence that the charge/discharge amounts of the battery units 1 and 2 may be set at negative values. In the charge mode, also, power allocation may be performed in a manner similar to the algorithm of FIG. 4.

In the above description, the lower limit was set at 0.0. However, if a minimum discharge amount is set for the battery units 1 and 2, for example, a similar procedure can be followed using the minimum discharge amount as the lower limit.

Embodiment 3

In a storage system, battery units may have their own maximum chargeable/dischargeable power values different from each other. In such a case, when charge/discharge power values are allocated to the battery units according to their SOCs as described in Embodiment 2, there is a possibility that part of the charge/discharge capacities of the battery units may be left unused. This will prevent effective use of the power of the entire storage system.

To address the above problem, in Embodiment 3, allocation of charge/discharge power is performed considering the maximum chargeable/dischargeable power values of the battery units, in addition to the SOCs.

Figure 5:
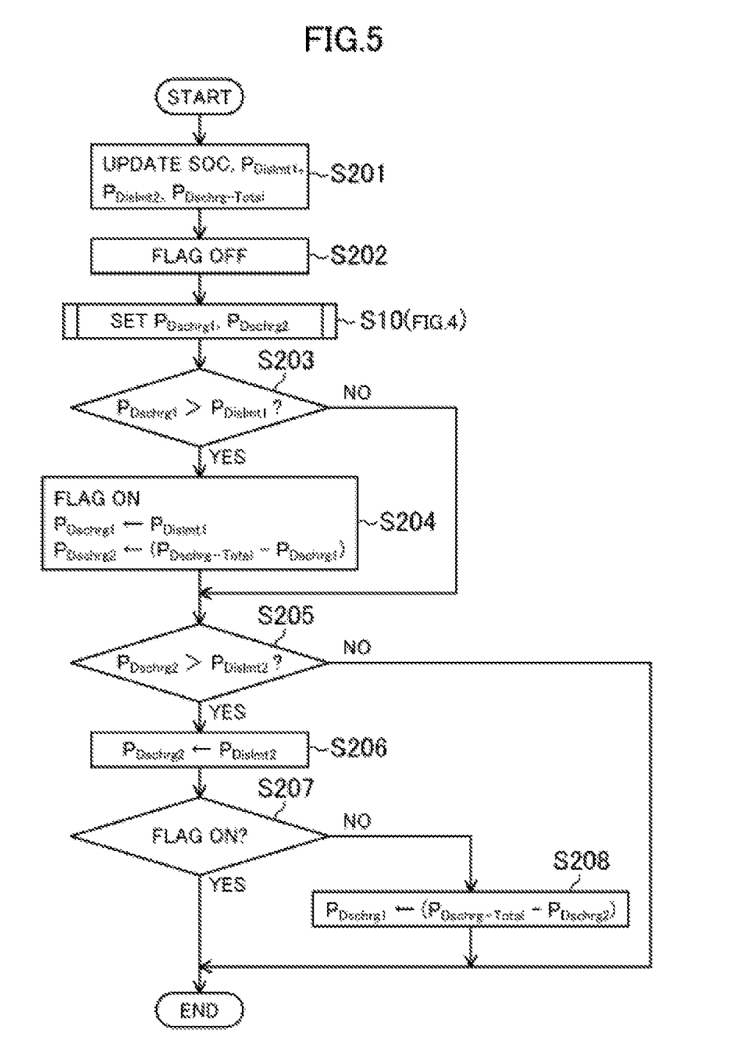
FIG. 5 shows an example of a power allocation algorithm according to Embodiment 3.

FIG. 5 shows an example of an algorithm according to this embodiment. The algorithm of FIG. 5 is related to power allocation in the discharge mode, on the assumption that power transmission between battery units is not permitted.

First, the SOCs and maximum dischargeable power values $P_{Dislmt1}$ and $P_{Dislmt2}$ of the battery units 1 and 2 and the total discharge power $P_{Dschrg\text{-}Total}$ of the storage system are updated (S201). A flag indicating that the discharge power value of the battery unit 1 or 2 has reached its maximum dischargeable power value is then set to OFF (S202).

Thereafter, the discharge power values $P_{Dschrg1}$ and $P_{Dschrg2}$ to be allocated to the battery units 1 and 2 are set (S10). This step S10 may be done according to the algorithm of FIG. 4 described in Embodiment 2.

Subsequently, whether or not $P_{Dschrg1}$ exceeds $P_{Dislmt1}$ is determined (S203). If $P_{Dschrg1}$ exceeds $P_{Dislmt1}$, the flag is changed to ON, and $P_{Dschrg1}$ is set at $P_{Dislmt1}$ and $P_{Dschrg2}$ is set at $(P_{Dschrg\text{-}Total}-P_{Dschrg1})$ (S204). If $P_{Dschrg1}$ does not exceed $P_{Dislmt1}$, neither $P_{Dschrg1}$ nor $P_{Dschrg2}$ is changed.

Thereafter, whether or not $P_{Dschrg2}$ exceeds $P_{Dislmt2}$ is determined (S205). If $P_{Dschrg2}$ does not exceed $P_{Dislmt2}$, the algorithm is terminated. If $P_{Dschrg2}$ exceeds $P_{Dislmt2}$, $P_{Dschrg2}$ is set at $P_{Dislmt2}$ (S206), and whether or not the flag is ON is determined (S207). If the flag is ON, the algorithm is terminated. If the flag is OFF, $P_{Dschrg1}$ is set at $(P_{Dschrg\text{-}Total}-P_{Dschrg2})$ (S208), and the algorithm is terminated.

For example, assuming that $P_{Dschrg\text{-}Total}$ is 7.0 kw, $SOC_1$ is 30%, and $SOC_2$ is 80%, $P_{Dschrg1}$ and $P_{Dschrg2}$ are computed in step S10 according to Equations (1) and (2) as follows.

$P_{Dschrg1}=((3\times0.3-0.8)/(2(0.3+0.8)))\times7.0=0.32$ kw $P_{Dschrg2}=((3\times0.8-0.3)/(2(0.3+0.8)))\times7.0=6.68$ kw In this case, assuming that $P_{Dislmt1}$ is 2.0 kw and $P_{Dislmt2}$ is 5.0 kw, $P_{Dschrg2}$ exceeds $P_{Dislmt2}$. Therefore, the following setting is made.

$P_{Dschrg2}=P_{Dislmt2}=5.0$ kw $P_{Dschrg1}=(P_{Dschrg\text{-}Total}-P_{Dschrg2})=(7.0-5.0)=2.0$ kw That is, according to this algorithm, when the charge/discharge power values set using the SOCs exceed the maximum charge/discharge power values of the battery units 1 and 2, the setting is made invalid for the purpose of utilizing the maximum power capacity of the storage system. In the charge mode, also, power allocation may be made in a manner similar to the algorithm of FIG. 5.

According to this embodiment, it is possible to avoid the possibility that part of the charge/discharge capacities of the battery units may be left unused, whereby the power of the entire storage system can be effectively used.

Embodiment 4

In a storage system in which a plurality of battery units are mounted, the electric capacity value of the entire system is equal to the total of the electric capacity values of the battery units. When the electric capacity values of the battery units are equal to each other, the electric power may be allocated according to the algorithm described in Embodiments 2 and 3.

However, in the case of adding a new battery unit to the existing storage system, for example, the electric capacity values of the battery units may be different from each other. When the electric capacity values of the battery units are different from each other, it is preferable to consider the difference in electric capacity value at the time of power allocation. The reason is that, since the SOC of a battery unit is a value representing the ratio of the remaining electric quantity to the electric capacity value of the battery unit, the SOC will have a different meaning for a battery unit having a different electric capacity value.

To address the above problem, in Embodiment 4, when the battery units 1 and 2 are different in electric capacity value, allocation of the charge/discharge power is performed after conversion of the SOC to a new SOC considering the difference in electric capacity value. That is, the acquired SOC values of the battery units 1 and 2 are converted to new SOC values using the electric capacity values of the battery units 1 and 2.

Computation Example in Discharge Mode

Assume that the electric capacity values of the battery units 1 and 2 are $WH_1$ and $WH_2$. $SOC_1$ and $SOC_2$ as the SOCs of the battery units 1 and 2 are converted to new SOCs, $SOC_{1\text{-}new\text{-}dschrg}$ and $SOC_{2\text{-}new\text{-}dschrg}$, according to Equations (5) and (6) below.

$$SOC_{1\text{-}new\text{-}dschrg} = \frac{SOC_1 WH_1}{WH_1 + WH_2} \quad (5)$$

$$SOC_{2\text{-}new\text{-}dschrg} = \frac{SOC_2 WH_2}{WH_1 + WH_2} \quad (6)$$

After the conversion, using $SOC_{1\text{-}new\text{-}dschrg}$ and $SOC_{2\text{-}new\text{-}dschrg}$ instead of $SOC_1$ and $SOC_2$, discharge allocation may be performed as in Embodiments 2 and 3 described above. As expressed in Equations (5) and (6) above, in the discharge mode, new SOC values are obtained by multiplying the SOC values of the battery units 1 and 2 by conversion factors determined using the electric capacity values of the battery units 1 and 2. At this time, the conversion factor by which the SOC value of the battery unit 1 or 2 whichever is higher in electric capacity value is multiplied may be made larger than the conversion factor by which the SOC value of the other battery unit is multiplied.

Computation Example in Charge Mode $SOC_1$ and $SOC_2$ are converted to new SOCs, $SOC_{1\text{-}new\text{-}dschrg}$ and $SOC_{2\text{-}new\text{-}dschrg}$, according to Equations (7) and (8) below.

$$SOC_{1\text{-}new\text{-}chrg} = \frac{SOC_1 WH_1 + WH_2}{WH_1 + WH_2} \quad (7)$$

$$SOC_{2\text{-}new\text{-}chrg} = \frac{SOC_2 WH_2 + WH_1}{WH_1 + WH_2} \quad (8)$$

After the conversion, using the new SOCs, $SOC_{1\text{-}new\text{-}dschrg}$ and $SOC_{2\text{-}new\text{-}dschrg}$ instead of $SOC_1$ and $SOC_2$, charge allocation may be performed as in Embodiments 2 and 3 described above.

For example, assuming that $SOC_1$ is 30%, $SOC_2$ is 80%, $WH_1$ is 3 kwh, and $WH_2$ is 7 kwh, the followings are computed according to Equations (5) to (8).

$SOC_{1\text{-}new\text{-}dschrg}=0.3\times3/(3+7)=0.09=9\%$ $SOC_{2\text{-}new\text{-}dschrg}=0.8\times7/(3+7)=0.56=56\%$ $SOC_{1\text{-}new\text{-}chrg}=(0.3\times3+7)/(3+7)=0.79=79\%$ $SOC_{2\text{-}new\text{-}chrg}=(0.8\times7+3)/(3+7)=0.86=86\%$ Using the above values, computation may be performed as in Embodiments 2 and 3 described above, to allocate the charge/discharge power.

The electric capacity value of a battery unit gradually decreases depending on the operation state. It is preferable to reflect this change in the above computation using the state of health (SOH). The SOH is a parameter indicating the degraded state of a battery unit, which is represented by the ratio of the remaining capacity to the initial electric capacity, for example. In this case, $WH_1$ and $WH_2$ are converted to $WH_1'$ and $WH_2'$ that are modified electric capacity values, using Equations (9) and (10) below.

$WH_1'=SOH_1 WH_1$ \quad (9)

$WH_2'=SOH_2 WH_2$ \quad (10)

Using the modified electric capacity values $WH_1'$ and $WH_2'$ instead of $WH_1$ and $WH_2$, Equations (5) to (8) may be computed to determine the new SOCs, $SOC_{1\text{-}new\text{-}dschrg}$, $SOC_{2\text{-}new\text{-}dschrg}$, $SOC_{1\text{-}new\text{-}chrg}$, and $SOC_{2\text{-}new\text{-}chrg}$.

According to this embodiment, even when the electric capacity values of the battery units 1 and 2 are different from each other, charge/discharge control can be performed accurately. For example, even when a battery unit different in electric capacity value from the existing battery unit is additionally installed in the storage system, suitable charge/discharge control can be realized.

Embodiment 5

In Embodiments 2 to 4, power allocation was described taking the case of using two battery units as an example. In Embodiment 5, allocation of charge/discharge power will be described for a storage system including n (n is an integer equal to or more than 3) battery units.

Figure 6:
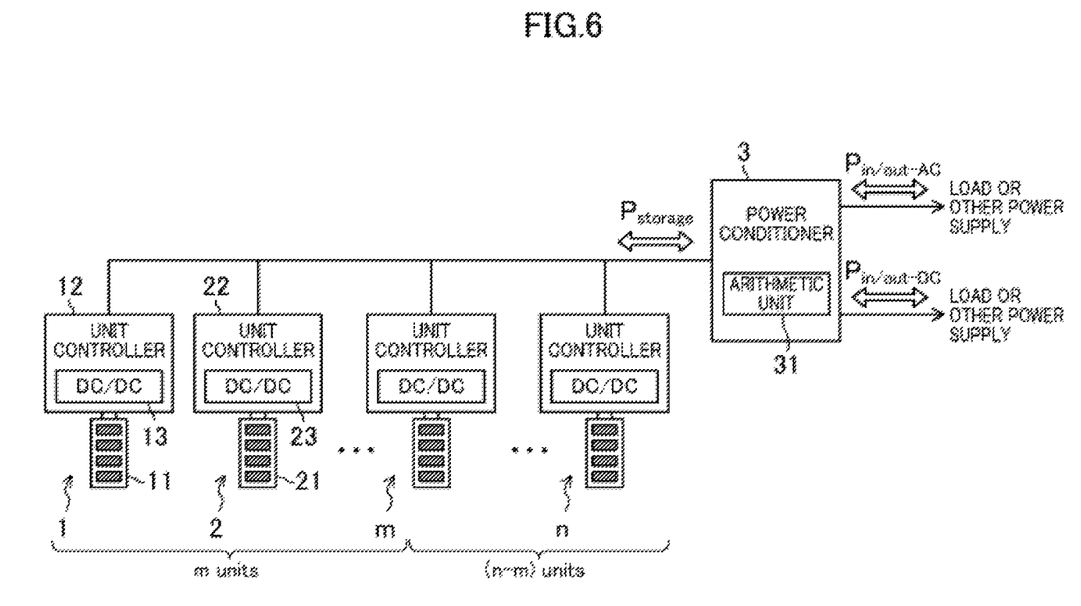
FIG. 6 shows a configuration example of a storage system of Embodiment 5.

FIG. 6 shows an configuration example of a storage system. The storage system of FIG. 6 includes n (n is an integer equal to or more than 3) battery units 1, 2, . . . , m, . . . , n. For such a storage system, power allocation can be performed by using the algorithms described in Embodiments 2 to 4 hierarchically.

That is, as shown in FIG. 6, n battery units are divided into a first group constituted by m battery units and a second group constituted by (n−m) battery units. The m battery units belonging to the first group are regarded as a single battery unit and the (n−m) battery units belonging to the second group are regarded as a single battery unit, to perform charge/discharge allocation using the methods in Embodiments 2 to 4 described above.

In this case, for each group regarded as a single battery unit, the equivalent electric capacity value, SOC, maximum charge power, and maximum discharge power are calculated. Specifically, for the first group constituted by m battery units, for example, an equivalent electric capacity value $WH_{eq\text{-}m}$, equivalent SOC $SOC_{eq\text{-}m}$, equivalent maximum discharge power $P_{DschrgMax\text{-}eq\text{-}m}$, and equivalent maximum charge power $P_{ChrgMax\text{-}eq\text{-}m}$ are calculated using Equations (11) to (14) below.

$$WH_{eq\text{-}m} = WH_1 + \ldots + WH_m \quad (11)$$

$$SOC_{eq\text{-}m} = \frac{SOC_1 WH_1 + \ldots + SOC_m WH_m}{WH_{eq\text{-}m}} \quad (12)$$

$$P_{DschrgMax\text{-}eq\text{-}m} = P_{DschrgMax1} + \ldots + P_{DschrgMaxm} \quad (13)$$

$$P_{ChrgMax\text{-}eq\text{-}m} = P_{ChrgMax1} + \ldots + P_{ChrgMaxm} \quad (14)$$

Similarly, for the second group constituted by (n−m) battery units, the equivalent electric capacity value, SOC, maximum charge power, and maximum discharge power are calculated. Using the calculated equivalent electric capacity values, SOCs, maximum charge power values, and maximum discharge power values, charge/discharge allocation is performed using the methods in Embodiments 2 to 4 described above.

Thereafter, the m battery units belonging to the first group are further divided into two groups. Regarding a plurality of battery units belonging to each of the divided groups as a single battery unit, the equivalent electric capacity value, SOC, maximum charge power, and maximum discharge power are calculated, and charge/discharge allocation is performed using the methods in Embodiments 2 to 4 described above. Similarly, the (n−m) battery units belonging to the second group are further divided into two groups. Regarding a plurality of battery units belonging to each of the divided groups as a single battery unit, the equivalent electric capacity value, SOC, maximum charge power, and maximum discharge power are calculated, and charge/discharge allocation is performed using the methods in Embodiments 2 to 4 described above.

Processing as described above is repeated until each group includes only one battery unit.

As described above, according to this embodiment, for a storage system including three or more battery units, since the charge/discharge amounts can be allocated to the battery units as in Embodiment 2 to 4, more suitable charge/discharge control can be realized.

<Derivation of Equations (1) to (4)>

Derivation of Equations (1) to (4) used in Embodiment 2 will be described hereinafter. As described below, Equations (1) and (2) are for allocating the discharge amounts in the discharge mode so that the SOCs of the battery units 1 and 2 can reach 0.0 at the same timing, and Equations (3) and (4) are for allocating the charge amounts in the charge mode so that the SOCs of the battery units 1 and 2 can reach 1.0 at the same timing. By using Equations (1) to (4), it is possible to make the utmost use of the energy of the storage system. Note that SOC=0.0 is an example of the discharge target value, and SOC=1.0 is an example of the charge target value.

Discharge Mode

Figure 7:
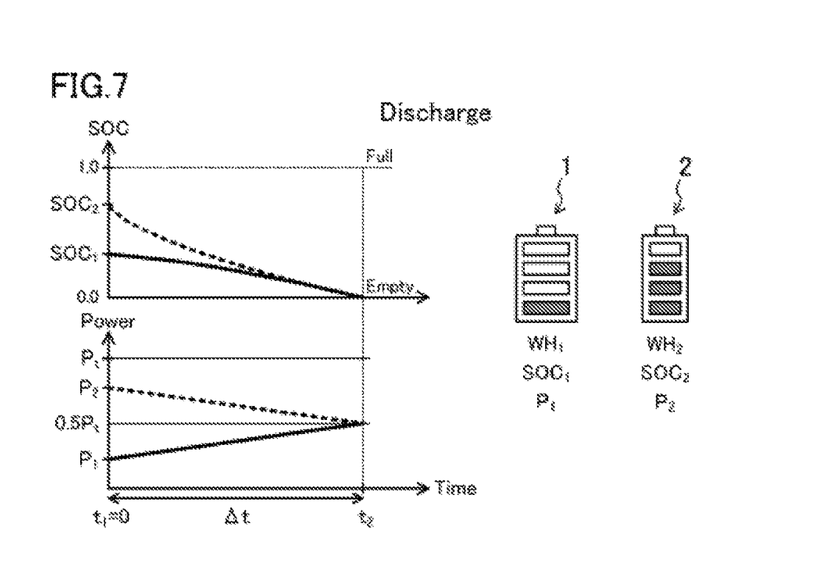
FIG. 7 is a graph showing an example of changes in SOC and discharge power in the discharge mode.

FIG. 7 is a graph showing examples of changes in SOC and discharge power in the discharge mode. In FIG. 7, the discharge power values $P_1$ and $P_2$ of the two battery units 1 and 2 change with changes of $SOC_1$ and $SOC_2$ of the battery units 1 and 2. $SOC_1$ and $SOC_2$ reach 0.0 at the same timing, at which the discharge power values $P_1$ and $P_2$ become equal to each other (0.5 $P_t$). Based on the premise of the change examples in FIG. 7, Equations (1) and (2) are derived.

From the graph of FIG. 7, the discharge power values $P_1$ and $P_2$ of the battery units 1 and 2 are expressed by the following equations.

$$P_1(t) = \frac{0.5P_t - K_1 P_t}{\Delta t} t + K_1 P_t$$

$$P_2(t) = \frac{0.5P_t - K_2 P_t}{\Delta t} t + K_2 P_t$$

where $K_1$ and $K_2$ are respectively the ratios of the discharge amounts allocated to the battery units 1 and 2 to the total discharge power, wherein $K_1 + K_2 = 1$.

The energy discharged by the battery unit 1 until $SOC_1$ reaches 0.0 is $$\Delta E_1 = \int_{t_1}^{t_2} P_1(t) dt = \int_{t_1}^{t_2} \left[ \frac{0.5P_t - K_1 P_t}{\Delta t} t + K_1 P_t \right] dt = \left[ \frac{0.5P_t - K_1 P_t}{2\Delta t} t^2 \mid K_1 P_t t \right]_0^{\Delta t} - \left( \frac{0.5P_t - K_1 P_t}{2} + K_1 P_t \right) \Delta t$$

which is equal to $SOC_1 \times WH_1$. Therefore, the following equation holds.

$$SOC_1 WH_1 = \left( \frac{0.5P_t - K_1 P_t}{2} \mid K_1 P_t \right) \Delta t$$

Similarly, the following equation holds for the battery unit 2.

$$SOC_2 WH_2 - \left( \frac{0.5P_t - K_2 P_t}{2} + K_2 P_t \right) \Delta t$$

By deleting $\Delta t$ and assuming that $WH_1 = WH_2$, the following equation holds.

$$\left( \frac{0.5P_t - K_1 P_t}{2} + K_1 P_t \right) \frac{SOC_1}{} = \left( \frac{0.5P_t - K_2 P_t}{2} + K_2 P_t \right) \frac{SOC_2}{}$$

Accordingly, $K_1$ and $K_2$ are as follows.

$$K_1 = \frac{3 SOC_1 - SOC_2}{2(SOC_1 + SOC_2)}$$

$$K_2 = \frac{3 SOC_2 - SOC_1}{2(SOC_1 + SOC_2)}$$

In this way, Equations (1) and (2) are derived.

Charge Mode

Figure 8:
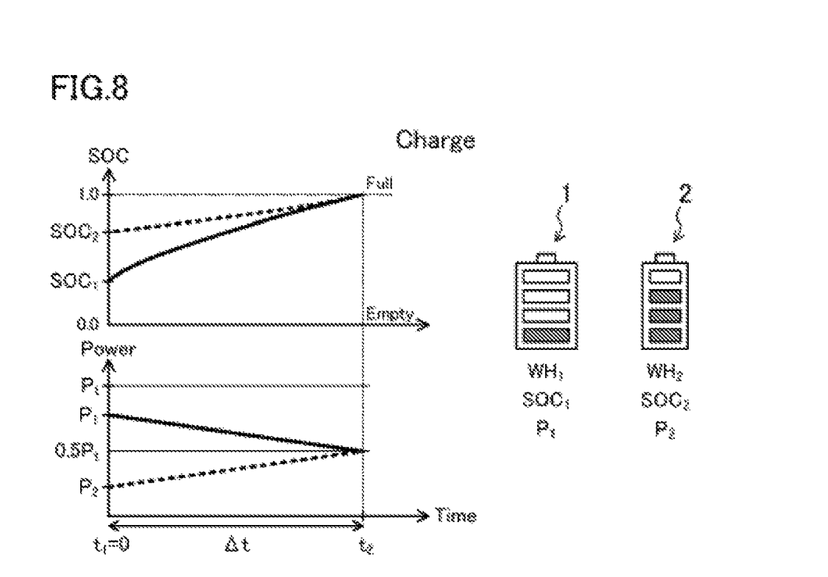
FIG. 8 is a graph showing an example of changes in SOC and charge power in the charge mode.

FIG. 8 is a graph showing examples of changes in SOC and charge power in the charge mode. In FIG. 8, the charge power values $P_1$ and $P_2$ of the two battery units 1 and 2 change with changes of $SOC_1$ and $SOC_2$ of the battery units 1 and 2. $SOC_1$ and $SOC_2$ reach 1.0 at the same timing, at which the charge power values $P_1$ and $P_2$ become equal to each other (0.5 $P_t$). Based on the premise of the change examples in FIG. 8, Equations (3) and (4) are derived.

In the charge mode, the energy values with which the battery units 1 and 2 are charged until $SOC_1$ and $SOC_2$ reach 1.0 are equal to $(1-SOC_1) \times WH_1$ and $(1-SOC_2) \times WH_2$, respectively. Therefore, the following equation holds.

$$\begin{cases} (1 - SOC_1) WH_1 - \left( \frac{0.5P_t - K_1 P_t}{2} + K_1 P_t \right) \Delta t \\ (1 - SOC_2) WH_2 = \left( \frac{0.5P_t - K_2 P_t}{2} + K_2 P_t \right) \Delta t \end{cases}$$

As in the discharge mode, by deleting $\Delta t$ and assuming that $WH_1 = WH_2$, $K_1$ ad K2 are as follows.

$$K_1 = \frac{2 - 3SOC_1 - SOC_2}{2(2 - (SOC_1 + SOC_2))}$$

$$K_2 = \frac{3SOC_2 - SOC_1}{2(2 - (SOC_1 + SOC_2))}$$

In this way, Equations (3) and (4) are derived.

(Alteration 1)

The discharge target value of SOC in the discharge mode is 0.0 in the graph of FIG. 7, and the charge target value of SOC in the charge mode is 1.0 in the graph of FIG. 8. However, the target values are not limited to these, but the discharge target value may be a value other than 0.0 and the charge target value may be a value other than 1.0.

For example, assume that the target value of SOC in the discharge mode is 0.05 and the target value of SOC in the charge mode is 0.95. In this case, in the discharge mode, based on that the energy values discharged by the battery units 1 and 2 until the SOCs reach 0.05 are equal to $(SOC_1 - 0.05) \times WH_1$ and $(SOC_2 - 0.05) \times WH_2$, $K_1$ and $K_2$ may be determined in a manner similar to that described above. Also, in the charge mode, based on that the energy values with which the battery units 1 and 2 are charged until the SOCs reach 0.95 are equal to $(0.95 - SOC_1) \times WH_1$ and $(0.95 - SOC_2) \times WH_2$, $K_1$ and $K_2$ may be determined in a manner similar to that described above.

The equations derived above are for allocating the discharge amounts in the discharge mode so that the SOCs of the battery units 1 and 2 can reach 0.05 at the same timing and for allocating the charge amounts in the charge mode so that the SOCs of the battery units 1 and 2 can reach 0.95.

Alternatively, the charge amounts or the discharge amounts may be allocated so that the SOCs of the battery units 1 and 2 can be sufficiently close to each other after the lapse of a predetermined time period, falling within a predetermined target range. For example, assume that the SOC target range is 0.0 to 0.1 in the discharge mode and 0.9 to 1.0 in the charge mode. In the discharge mode, the discharge amounts may be allocated so that the SOCs of the battery units 1 and 2 can fall within the range of 0.0 to 0.1 after the lapse of a predetermined time period. In the charge mode, the charge amounts may be allocated so that the SOCs of the battery units 1 and 2 can fall within the range of 0.9 to 1.0 after the lapse of a predetermined time period.

That is, the computation for determining the charge/discharge amounts of the battery units 1 and 2 may be such that, in the discharge mode, the discharge amounts are allocated to the battery units 1 and 2 so that the SOCs of the battery units 1 and 2 can be gradually closer to each other while falling, and, in the charge mode, the charge amounts are allocated to the battery units 1 and 2 so that the SOCs of the battery units 1 and 2 can be gradually closer to each other while rising.

(Alteration 2)

Figure 9:
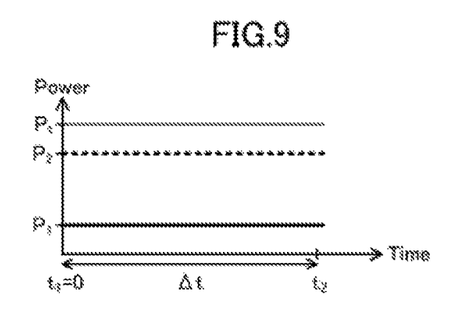
FIG. 9 is a graph showing an example of a change in discharge power in the discharge mode.

In the derivation of Equations (1) to (4) described above, the discharge power values and charge power values of the battery units 1 and 2 change with changes of the SOCs. Alternatively, as shown in FIG. 9, the charge/discharge power values $P_1$ and $P_2$ of the battery units may be constant during the time until the SOCs become zero.

In this case, the following equation holds.

$$\begin{cases} \dfrac{\Delta E_1}{P_1} = \dfrac{\Delta E_2}{P_2} \\ P_t = P_1 + P_2 \end{cases} \xrightarrow{\Delta E = SOC \times WH \text{ and } WH_1 = WH_2} \begin{cases} \dfrac{SOC_1}{P_1} = \dfrac{SOC_2}{P_2} \\ P_t = P_1 + P_2 \end{cases}$$

$$\begin{cases} \dfrac{SOC_1}{K_1} = \dfrac{SOC_2}{K_2} \\ K_1 + K_2 = 1 \end{cases}$$

Accordingly, $K_1$ and $K_2$ are as follows.

$$\begin{cases} K_1 = \dfrac{SOC_1}{SOC_1 + SOC_2} \\ K_2 = \dfrac{SOC_2}{SOC_1 + SOC_2} \end{cases}$$

In the case of using the computing equations obtained in this alteration, also, a larger discharge amount can be allocated to a battery unit higher in SOC in the discharge mode, and a larger charge amount can be allocated to a battery unit lower in SOC in the charge mode.

The present disclosure is very useful in performing suitable charge/discharge control in a storage system including a plurality of battery units.

What is claimed is:

1. A method for controlling charge/discharge of first and second battery units in a storage system including the first and second battery units, comprising:

acquiring values of a state of charge (SOC; a ratio of a remaining electric quantity to an electric capacity value) of the first and second battery units; and determining charge/discharge amounts of the first and second battery units according to predetermined computation using the acquired SOC values, the charge/discharge amount of the first battery unit being determined using both the SOC value of the first battery unit and the SOC value of the second battery unit, and the charge/discharge amount of the second battery unit being determined using both the SOC value of the first battery unit and the SOC value of the second battery unit, wherein the predetermined computation includes allocating a larger discharge amount to a battery unit higher in SOC, out of the first and second battery units, in a discharge mode, and allocating a larger charge amount to a battery unit lower in SOC, out of the first and second battery units, in a charge mode, and in the discharge mode, when total discharge power of the storage system is $P_{Dschrg\text{-}Total}$, the SOCs of the first and second battery units are SOC1 and SOC2, and discharge amounts allocated to the first and second battery units are $P_{Dschrg1}$ and $P_{Dschrg2}$, $P_{Dschrg1}$ and $P_{Dschrg2}$ are computed according to Equations (1) and (2) below, and $$P_{Dschrg1} = \dfrac{3SOC_1 - SOC_2}{2(SOC_1 + SOC_2)} P_{Dschrg\text{-}Total} \quad (1)$$

$$P_{Dschrg2} = \dfrac{3SOC_2 - SOC_1}{2(SOC_1 + SOC_2)} P_{Dschrg\text{-}Total} \quad (2)$$

in the charge mode, when total charge power of the storage system is $P_{Chrg\text{-}Total}$ and charge amounts allocated to the first battery units are $P_{Chrg1}$ and $P_{Chrg2}$, $P_{Chrg1}$ and $P_{Chrg2}$ are computed according to Equations (3) and (4) below, $$P_{Chrg1} = \dfrac{2 - 3SOC_1 + SOC_2}{2(2 - (SOC_1 + SOC_2))} P_{Chrg\text{-}Total} \quad (3)$$

$$P_{Chrg2} = \dfrac{2 - 3SOC_2 + SOC_1}{2(2 - (SOC_1 + SOC_2))} P_{Chrg\text{-}Total}. \quad (4)$$

2. The method of claim 1, wherein
the predetermined computation includes
allocating the discharge amounts to the first and second battery units so that the SOCs of the first and second battery units can be gradually closer to each other while falling in the discharge mode, and
allocating the charge amounts to the first and second battery units so that the SOCs of the first and second battery units can be gradually closer to each other while rising in the charge mode.

3. The method of claim 2, wherein
the predetermined computation includes
allocating the discharge amounts to the first and second battery units so that the SOCs of the first and second battery units can reach a discharge target value at the same timing in the discharge mode, and
allocating the charge amounts to the first and second battery units so that the SOCs of the first and second battery units can reach a charge target value at the same timing in the charge mode.

4. A method for controlling charge/discharge of a plurality of battery units in a storage system including the plurality of battery units, comprising the steps of:

(a) dividing the plurality of battery units into two groups;

(b) calculating, using a state of charge (SOC; a ratio of a remaining electric quantity to an electric capacity value) of a battery unit belonging to each of the two groups, an equivalent SOC of each of the two groups;

(c) determining charge/discharge amounts of the two groups according to predetermined computation using the calculated equivalent SOCs, the charge/discharge amount of one of the two groups being determined using both the equivalent SOCs of the two groups, and the charge/discharge amount of another of the two groups being determined using both the equivalent SOCs of the two groups;

(d) further dividing a plurality of battery units included in each of the groups into two groups and executing steps (b) and (c); and (e) repeating step (d) until each group includes only one battery unit with a first battery unit in a first of the two groups and a second battery unit in a second of the two groups, wherein the predetermined computation includes allocating a larger discharge amount to a group higher in equivalent SOC, out of the two groups, in a discharge mode, and allocating a larger charge amount to a group lower in equivalent SOC, out of the two groups, in a charge mode, and in the discharge mode, when total discharge power of the storage system is $P_{Dschrg\text{-}Total}$, the SOCs of the first and second battery units are SOC1 and SOC2, and discharge amounts allocated to the first and second battery units are $P_{Dschrg1}$ and $P_{Dschrg2}$, $P_{Dschrg1}$ and $P_{Dschrg2}$ are computed according to Equations (1) and (2) below, and $$P_{Dschrg1} = \frac{3SOC_1 - SOC_2}{2(SOC_1 + SOC_2)} P_{Dschrg\text{-}Total} \quad (1)$$

$$P_{Dschrg2} = \frac{3SOC_2 - SOC_1}{2(SOC_1 + SOC_2)} P_{Dschrg\text{-}Total} \quad (2)$$

in the charge mode, when total charge power of the storage system is $P_{Chrg\text{-}Total}$ and charge amounts allocated to the first battery units are $P_{Chrg1}$ and $P_{Chrg2}$, $P_{Chrg1}$ and $P_{Chrg2}$ are computed according to Equations (3) and (4) below.

$$P_{Chrg1} = \frac{2 - 3SOC_1 + SOC_2}{2(2 - (SOC_1 + SOC_2))} P_{Chrg\text{-}Total} \quad (3)$$

$$P_{Chrg2} = \frac{2 - 3SOC_2 + SOC_1}{2(2 - (SOC_1 + SOC_2))} P_{Chrg\text{-}Total}. \quad (4)$$

5. A control device for controlling charge/discharge of first and second battery units in a storage system including the first and second battery units, comprising an arithmetic unit configured to determine charge/discharge amounts of the first and second battery units using values of a state of charge (SOC; a ratio of a remaining electric quantity to an electric capacity value) of the first and second battery units, the charge/discharge amount of the first battery unit being determined using both the SOC value of the first battery unit and the SOC value of the second battery unit, and the charge/discharge amount of the second battery unit being determined using both the SOC value of the first battery unit and the SOC value of the second battery unit, wherein the arithmetic unit allocates a larger discharge amount to a battery unit higher in SOC, out of the first and second battery units, in a discharge mode, and allocates a larger charge amount to a battery unit lower in SOC, out of the first and second battery units, in a charge mode, and in the discharge mode, when total discharge power of the storage system is $P_{Dschrg\text{-}Total}$, the SOCs of the first and second battery units are SOC1 and SOC2, and discharge amounts allocated to the first and second battery units are $P_{Dschrg1}$ and $P_{Dschrg2}$, $P_{Dschrg1}$ and $P_{Dschrg2}$ are computed according to Equations (1) and (2) below, and $$P_{Dschrg1} = \frac{3SOC_1 - SOC_2}{2(SOC_1 + SOC_2)} P_{Dschrg\text{-}Total} \quad (1)$$

$$P_{Dschrg2} = \frac{3SOC_2 - SOC_1}{2(SOC_1 + SOC_2)} P_{Dschrg\text{-}Total} \quad (2)$$

in the charge mode, when total charge power of the storage system is $P_{Chrg\text{-}Total}$ and charge amounts allocated to the first battery units are $P_{Chrg1}$ and $P_{Chrg2}$, $P_{Chrg1}$ and $P_{Chrg2}$ are computed according to Equations (3) and (4) below.

$$P_{Chrg1} = \frac{2 - 3SOC_1 + SOC_2}{2(2 - (SOC_1 + SOC_2))} P_{Chrg\text{-}Total} \quad (3)$$

$$P_{Chrg2} = \frac{2 - 3SOC_2 + SOC_1}{2(2 - (SOC_1 + SOC_2))} P_{Chrg\text{-}Total}. \quad (4)$$

\* \* \* \* \*